(12) United States Patent
Milgram

(10) Patent No.: US 7,324,016 B1
(45) Date of Patent: Jan. 29, 2008

(54) NAVIGATIONAL INDICATING SYSTEM FOR ROTARY WING AIRCRAFT

(75) Inventor: Judah H. Milgram, Hyattsville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 226 days.

(21) Appl. No.: 11/288,070

(22) Filed: Nov. 22, 2005

(51) Int. Cl.
- G08B 21/00 (2006.01)
- B64D 47/02 (2006.01)
- B64D 47/06 (2006.01)
- B64C 27/00 (2006.01)
- G06F 7/70 (2006.01)
- G01C 17/00 (2006.01)

(52) U.S. Cl. ............ 340/981; 340/946; 340/978; 362/470; 416/5; 244/17.11; 701/14; 73/178 H

(58) Field of Classification Search ............ 340/946, 340/978, 981; 362/470; 244/17.11; 416/5; 73/178 H; 701/14
See application file for complete search history.

(56) References Cited

U.S. PATENT DOCUMENTS

| | | | |
|---|---|---|---|
| 2,423,528 A | 7/1947 | Stewart | |
| 2,555,807 A | 6/1951 | Morris | |
| 3,174,552 A | 3/1965 | Soucy, Jr. | |
| 3,395,875 A | 8/1968 | Donovan | |
| 3,701,498 A | 10/1972 | Ferrara | |
| 3,710,311 A * | 1/1973 | Avital | 340/946 |
| 3,723,722 A | 3/1973 | Van Iderstinie et al. | |
| 4,066,890 A | 1/1978 | Hamilton et al. | |
| 4,465,367 A * | 8/1984 | Sabatier | 356/23 |
| 4,916,581 A | 4/1990 | Authier | |
| 5,229,956 A * | 7/1993 | Daniell et al. | 702/175 |
| 5,671,051 A | 9/1997 | Wright, Jr. | |
| 5,793,164 A | 8/1998 | Authier | |
| 6,048,172 A | 4/2000 | Pniel | |

OTHER PUBLICATIONS

Lubke, Kpt. A., Translated Excerpt from "Die geschichtliche Entwicklung der Lichterfuhrung im SeestraBenverkehr", from " Der Seewart—Nautische Zeitschrift Fur di Deutsche Seechiffahrt", vol. 18, No. 3, 1957, pp. 95-105.

* cited by examiner

Primary Examiner—Benjamin C. Lee
Assistant Examiner—Lam Pham
(74) Attorney, Agent, or Firm—Jacob Shuster

(57) ABSTRACT

Red, green and white colored lights are emitted from navigation orientation indicating light emitting devices mounted within a helicopter rotor blade near its tip. The light emissions from such devices are under control to respectively indicate passage of the rotor blade through limited arcuate portions of the travel path of the rotor blade end tip. Operational control over the light emitting devices is effected by data processing of outputs from air-speed responsive sensors on the blade end tip.

10 Claims, 2 Drawing Sheets

NAVIGATIONAL INDICATING SYSTEM FOR ROTARY WING AIRCRAFT

The present invention relates generally to indicating changes in navigational orientation of rotary wing aircraft such as helicopters.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Lighting systems for indicating navigational orientation of sea vessels and aircraft are generally known in the art. In regard to fixed-wing aircraft, the lighting systems include red and green position lights attached to the wing tips. Such lighting systems allow observers to determine whether an aircraft is headed towards or away from them, by observing the relative position of the red and green lights. Rotary wing aircraft such as helicopters and gyrocopters provide no fixed surfaces on the port and starboard sides of the aircraft. To date, the problems associated with the lighting systems have been approached by affixing the position of the red and green lights to the port and starboard sides of the aircraft fuselage. However, this provides relatively low geometric separation between the lights, making it more difficult to identify the orientation of the aircraft. Furthermore the aircraft's fuselage tends to restrict the range of relative azimuths over which both red and green lights can be seen simultaneously.

Navigational lighting systems have been proposed for helicopters in which the lights are affixed to the tips of the rotating blades, emitting red and green light in alternation over appropriate angles of revolution to provide the observer with the perception of steady red and green lights on the port and starboard edges of the rotor disk, and optionally a white light on the forward and aft edges of the disk. Such systems require means to control the lights to ensure that they are properly timed with respect to the rotation of the blades. According to U.S. Pat. No. 2,423,528 to Stewart, the lights are controlled via an electric slip ring that also provides the power to the lights. Such slip rings are unreliable, especially in wet weather, and add to the maintenance burden. According to U.S. Pat. No. 3,174,552 to Soucy, the lights are switched by remote control via a wireless transmitter in the fuselage and receivers at the blade tips with no disclosure of means for timing operation of the lights. According to U.S. Pat. No. 3,701,498 to Ferrar and U.S. Pat. No. 3,723,722 to Iderstine et al., optical slip rings with the light are carried to the blade tips via fiber optics. As with the electrical slip ring, such system requires maintenance to keep the optical slip ring surfaces clean and polished.

It is therefore an object of the present invention to provide a navigational indicating system for rotary wing aircraft having means for controlling the blade tip lights that overcome the aforementioned difficulties. It is a further object of the present invention to provide a blade tip lighting system that requires low power and is resistant to damage due to mechanical vibration.

The latter referred relevant prior art is disclosed for example in documents accompanying the filing of the present application.

SUMMARY OF THE INVENTION

In accordance with the present invention, differently colored navigation orientation indicating lights, are emitted by red, green and white light devices mounted on or near the tips of the rotor blades of rotary wing aircraft. Airspeed responsive sensors, such as stagnation pressure sensors, hot-wire anemometers, and acoustic sensors are also mounted on the rotor blades near the tips to provide a signal reflecting airspeed relative to the blade tips. The airspeed responsive signal is communicated to a data processor located within the blades for determining the relative azimuth of the blade with respect to its advancing side. By convention, azimuth is measured with respect to the blade-over-tail position, so that the advancing side corresponds to azimuth angle $\psi=90°$. Each colored light is switched on and off over preset ranges of blade azimuth. For example, where a rotor whose advancing side is on the right side of the aircraft, the green light may be illuminated over a 30° arc centered on $\psi=90°$, while the red light over a 30° arc is centered about $\psi=270°$, and the white light over a 30° arc is centered about $\psi=0°$.

BRIEF DESCRIPTION OF THE DRAWINGS

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
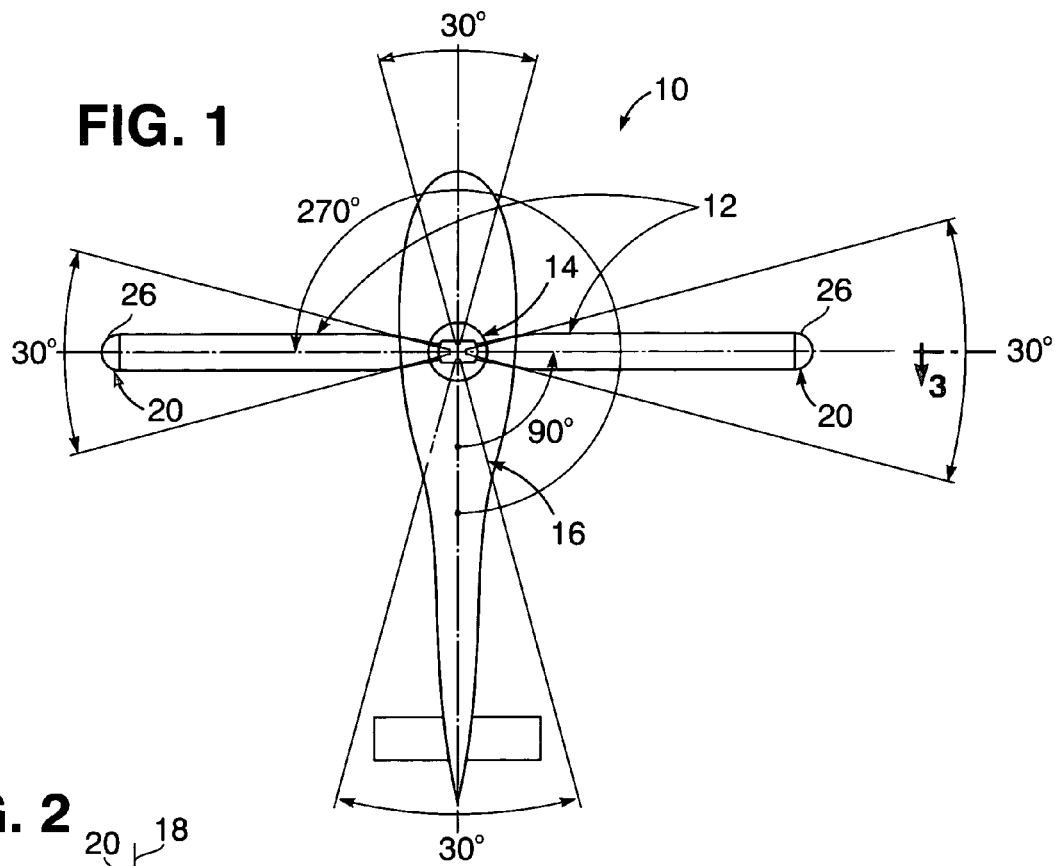
FIG. 1 is a top plan elevation view of a helicopter having a rotor blade with which the present invention is associated, in a position extending laterally from the helicopter fuselage.
Figure 2:
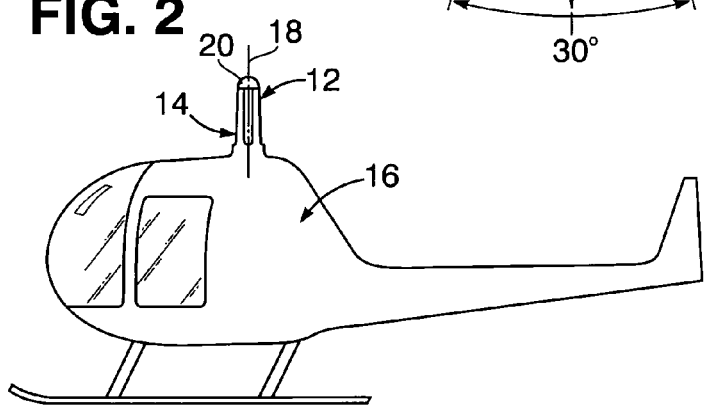
FIG. 2 is a side elevation view of the helicopter as shown in FIG. 1.
Figure 2A:
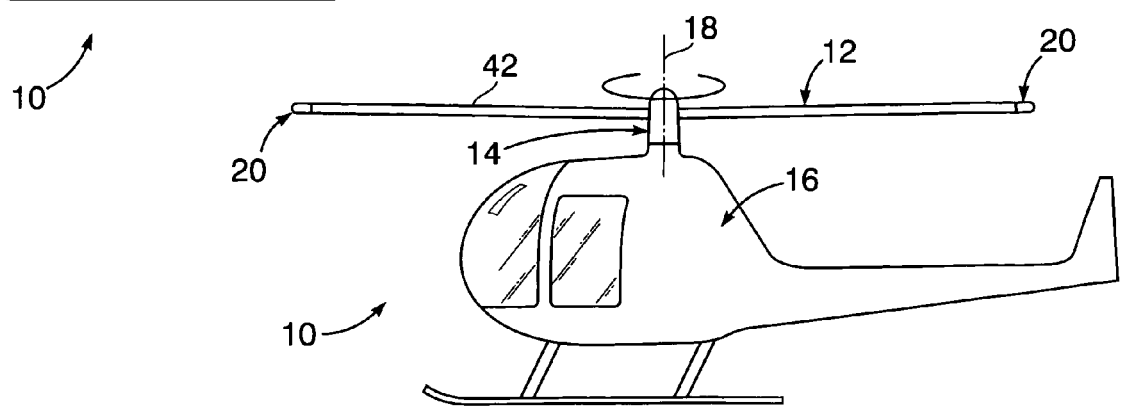
FIG. 2A is a side elevation view of the helicopter with the rotor blade in a position longitudinally aligned with the helicopter fuselage.

Referring now to the drawing in detail, FIG. 1 illustrates a rotary wing type of aircraft such as a helicopter 10 having rotor blades 12 as rotary wings connected to a rotor shaft 14 extending upwardly from a fuselage 16 for rotation about an axis 18 during flight of the helicopter 10, as generally known in the art. The rotor blades 12 which undergo rotation in a counterclockwise direction as viewed from above the aircraft 10 as shown in FIG. 1, have end tip portions 20. Pursuant to the present invention, navigational orientation of the aircraft 10 is indicated by emergence of signal lights from the end tip portions 20 of the rotor blades 12 as hereinafter explained.

Figure 3:
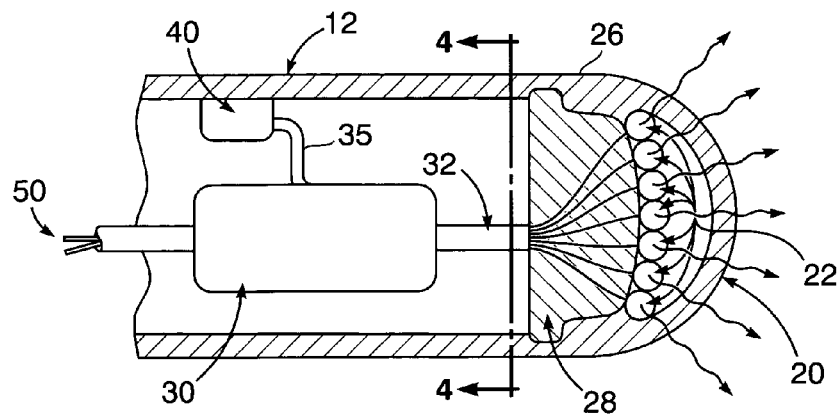
FIG. 3 is a partial section view taken substantially through a plane indicated by section line 3-3 in FIG. 1.
Figure 4:
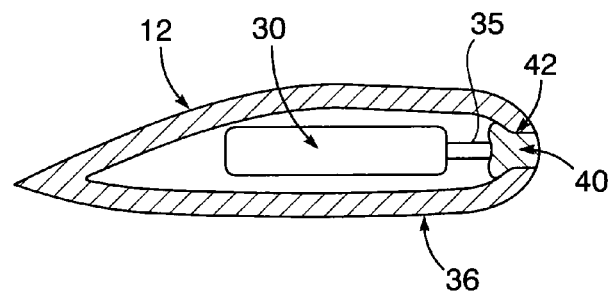
FIG. 4 is a section view taken substantially through a plane indicated by section line 4-4 in FIG. 3.

Each of the rotor blade end tips 20 has light emitting lamp devices 22 as shown in FIG. 3, from which red, green, and white lights are emitted. The devices 22 are switched on and off so as to shine green over an arc of approximately 30° of the rotor blade azimuth on the right hand side of the aircraft 10, red over an arc of approximately 30° rotor azimuth on the left hand side of the aircraft 10, and white over arcs of approximately 30° rotor azimuth over both the forward and aft ends of the aircraft 10 as indicated in FIG. 1. According to the embodiment shown in FIG. 3, a carrier 28 mounts the devices 22, which are in the form of light-emitting diodes (LED). A transparent protective tip cap 26 is mounted over the LED carrier 28 to serve as an aerodynamic fairing and protect the LED carrier 28 with the diode devices 22 thereon from which red, green, and white lights are emitted in sequence. Each group of the LED devices 22 of a single one of the red, green and white colors is wired to switch on or off simultaneously. An airspeed-responsive sensor 40 is mounted on each of the rotor blades 12 near the blade tip 20 as shown in FIG. 3. The LED devices 22 are powered through cables 32 from a control unit 30 mounted within the rotor blade 12 just inboard of the blade tip 20 as shown in FIGS. 3 and 4. The control unit 30 may be powered through cables 50 receiving electrical power via a slip ring from the aircraft electrical power bus mounted within the aircraft fuselage 16.

Figure 5:
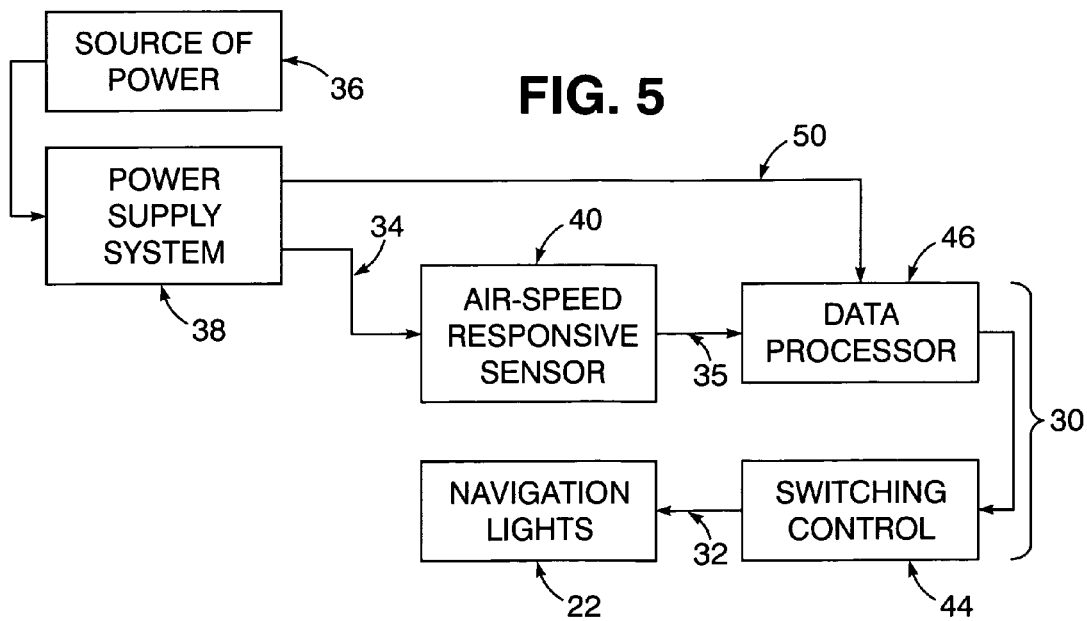
FIG. 5 is a block diagram of the navigation orientation indicating system embodied in the helicopter rotor blade illustrated in FIGS. 1-4.

The signal control units 30 associated with the rotor blade end tips 20 include a switching control 44 and a data processor 46 as diagrammed in FIG. 5. The switching control 44 is connected to the LED devices 22, by separate cables 32 for red, green, and white, and to the data processor 46 to which the signal from the airspeed-responsive sensor 40 is transmitted via a signal cable 35.

In the embodiment shown in FIGS. 1-4, the airspeed-responsive sensor 40 is a stagnation pressure sensor, generating a signal that is a function of a plurality of functions including hovering tip Mach number ($M_T$), ambient air pressure ($P_S$), specific heat ratio ($\gamma$), radial station (x) of the sensor 40 expressed as a fraction of the rotor blade radius, and aircraft's advance ratio ($\mu$). Such functions are interrelated by the equation:

$$P_T = P_S\left(1 + \frac{\gamma - 1}{2}M_T^2(x + \mu\sin\psi)^2\right)^{\gamma/(\gamma-1)}$$

For typical values of x, $\mu$, and $M_T$, the 1/revolution component of the generated signal is essentially in phase with sin $\psi$. Thus, if the output of the sensor 40 is subjected to a harmonic analysis based on an arbitrary time interval, the resulting 1/revolution sine and cosine components allow a determination of the time at which the blade 12 passes through any arbitrary azimuth angle $\psi$. For example, in the configuration shown in FIG. 2, the analysis allows timing of all light switching events, namely "green on" at $\omega$=75°, "green off" at $\psi$=105°, "white on" at $\psi$=165° and 345°, "white off" at $\psi$=195° and 15°, "red on" at $\Psi$=255°, and "red off" at $\psi$=285°.

The harmonic analysis of the signal from the pressure sensor 40 is performed by the data processor 46 for example by sampling the signal at a suitably high frequency and performing a discrete Fourier transform. The 1/revolution component may be identified as corresponding to the large peak in the frequency content at or near the known rotor speed. The mathematical methods for performing this signal processing are generally known in the art. Small errors in phase determination, for example those due to the unsteady aerodynamic environment at the rotor disk, are tolerable if the light signals continue to provide unambiguous indication of navigational orientation.

Low-speed operations may be detected by observing when the 1/revolution component of the airspeed signal is small relative to its steady value. These conditions correspond to ground operations and hover prior to takeoff or landing. When this condition is detected, the data processor 46 will signal switch on of all light-emitting devices 22 continuously, to alert ground personnel and provide them with a clear visual indication of the location of the rotor disk. In alternative embodiments, the airspeed-responsive sensor 40 may be a hot-wire anemometer or an acoustic sensor.

The problems heretofore referred to with respect to helicopter fuselage mounting of navigation lights is alleviated by the present invention. Also improved nighttime visibility and easier recognition of the navigation lights is provided for pilots of other aircraft, for ground crews and for air traffic personnel. Also pursuant to the present invention, the advancing and retreating sides of the rotating helicopter blades 12, from which the green and red lights respectively emerge, is reversed on other types of helicopters wherein blade rotation is in a normal clockwise direction rather than the counterclockwise direction hereinbefore referred to.

According to other embodiments of the present invention, in addition to the basic red, green and white lights emitted by the light emitting devices 22 from the helicopter rotor blade 12 other light-emitting sources may be provided for. For example, emitted lights that are compatible with night-vision goggles may be provided so as to facilitate aircraft flight formation at night. The use of monochromatic image night-vision goggles may be allowed by utilizing a monochromatic control pattern for light emission, such as a double-flash pattern on the left side of the aircraft 10 as viewed in FIG. 1 over arcs ($\psi$) equal to 245°-260° and 280°-295°, while a single-flash pattern emission is viewed on the right side of the aircraft 10 over an arc ($\psi$) of 75°-105°. Either a standard bright red/green single-flash pattern or a compatible color dim night-vision goggle type of double flash pattern emission on the left side of the aircraft may be provided under control of a pilot-selection system, involving transmission of data to the data processor 46 through the main rotor shaft slip ring or by radio telemetry as examples of convenient data transmission methods. Also by emission of navigation orientation lights only upwardly from the helicopter rotor blade, detection thereof from trailing aircraft above and behind the helicopter is accommodated, while observers on the ground will not be able to detect such lights.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a helicopter having a rotor blade with a leading edge; a system for indicating navigational orientation of the aircraft during flight, comprising: light emitting means within said rotor blade for emission of signal light therefrom; airspeed-responsive sensor means operatively connected to the light emitting means for establishing on and off phases of the light emission therefrom; and data processing means operatively connected to the sensor means for determining proper timing of the on and off phases of the light emission.

2. The combination as defined in claim 1, wherein said signal light emitted from the light emitting means is of different colors.

3. The combination as defined in claim 2, wherein the light emitting means comprises a matrix of differently colored lamp devices that are switched on or off at the same time; and a transparent protective aerodynamic cap covering the light emitting means.

4. The combination as defined in claim 1, wherein the light emitting means comprises a series of electroluminescent panels.

5. The combination as defined in claim 1, wherein said airspeed-responsive sensor is a stagnation pressure sensor.

6. The combination as defined in claim 1, wherein said airspeed-responsive sensor is a hot-wire anemometer.

7. The combination as defined in claim 1, wherein said airspeed-responsive sensor is an acoustic sensor.

8. The combination as defined in claim 1, wherein the data processing means identifies a low-airspeed operating condition of the rotary wing aircraft based on signal from the airspeed-responsive sensor, switching on the light-emitting means continuously.

9. The combination as defined in claim 1 wherein the light emitting means includes light sources compatible with night-vision sensors.

10. The combination as defined in claim 9, wherein the system includes: switching control means for switching operation of the light emitting means between a standard red/green/white color pattern and a monochromatic pattern compatible with night-vision sensors.

\* \* \* \* \*